US012401140B2

(12) United States Patent
Katsuramaki et al.

(10) Patent No.: US 12,401,140 B2
(45) Date of Patent: Aug. 26, 2025

(54) CONNECTOR DEVICE

(71) Applicant: YAZAKI CORPORATION, Tokyo (JP)

(72) Inventors: Takahiko Katsuramaki, Shizuoka (JP); Hayato Yamaguchi, Shizuoka (JP); Sadaharu Okuda, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 193 days.

(21) Appl. No.: 18/452,818

(22) Filed: Aug. 21, 2023

(65) Prior Publication Data

US 2024/0088582 A1 Mar. 14, 2024

(30) Foreign Application Priority Data

Sep. 12, 2022 (JP) ................................ 2022-144778

(51) Int. Cl.
*H01R 9/00* (2006.01)
*H01R 9/24* (2006.01)

(52) U.S. Cl.
CPC ......... *H01R 9/2416* (2013.01); *H01R 9/2433* (2013.01); *H01R 2201/26* (2013.01)

(58) Field of Classification Search
CPC . H01R 9/2416; H01R 9/2433; H01R 2201/26
See application file for complete search history.

(56) References Cited

U.S. PATENT DOCUMENTS

| | | | | |
|---|---|---|---|---|
| 4,567,654 | A | 2/1986 | Kloenne et al. | |
| 2006/0197378 | A1 | 9/2006 | Nagasawa et al. | |
| 2010/0029110 | A1 * | 2/2010 | Kiryu | H01R 13/7038 439/188 |
| 2017/0338201 | A1 * | 11/2017 | Shimakawa | H01L 25/0655 |
| 2018/0301246 | A1 * | 10/2018 | Ito | H01B 7/0853 |
| 2021/0036457 | A1 * | 2/2021 | Aoki | H01R 13/748 |

FOREIGN PATENT DOCUMENTS

| | | | |
|---|---|---|---|
| JP | 2004-306697 | A | 11/2004 |
| JP | 2005-63890 | A | 3/2005 |
| JP | 2012-236472 | A | 12/2012 |

* cited by examiner

*Primary Examiner* — Pete T Lee
(74) *Attorney, Agent, or Firm* — Sughrue Mion, PLLC

(57) ABSTRACT

A connector device has a constitution in a connector in which a plurality of terminals protrude into a connector opening. The plurality of terminals are respectively provided with a plurality of switches that have independent states of supplying power to the terminals and are switchable in between. A plurality of conductor plates are provided in the connector opening in an attachable and detachable state, and are each configured to electrically connect at least two of the plurality of terminals. The plurality of conductor plates are coupled by an insulating member.

4 Claims, 4 Drawing Sheets

CONNECTOR DEVICE

CROSS-REFERENCE TO RELATED APPLICATIONS

This application is based on and claims priority under 35 USC 119 from Japanese Patent Application No. 2022-144778 filed on Sep. 12, 2022, the contents of which are incorporated herein by reference.

TECHNICAL FIELD

The present disclosure relates to a connector device.

Various types of electronic components are disposed at various portions of a vehicle. Electronic control units (ECUs) mounted on portions of a vehicle are required to control various electronic components to be controlled, that is, on and off of loads, magnitude of output and the like, with switch circuits.

For example, in a configuration shown in FIG. 2 of JP2012-236472A, an output circuit including four semiconductor switch elements Q1H, Q1L, Q2H, and Q2L is used to bidirectionally control a current flowing through an electric motor 20 that is a load. An ECU including such an output circuit (switch circuit) is generally connected to a load via a wire harness including a predetermined connector.

However, switch circuits provided in ECUs are required to comply with types and specifications of loads. For example, when controlling an electric motor requiring bidirectional current control, four switch elements are necessary for one load, as in the output circuit 40 in JP2012-236472A. On the other hand, when controlling loads such as an electric motor, a lamp, and a heater that do not require switching of a driving direction, each of the loads can be controlled by one switch alone.

In addition, a switch for applying a high voltage to a positive terminal of a load may be necessary, or a switch for applying a low voltage to a negative terminal of a load may be necessary, depending on a type and a specification of a load. Accordingly, circuit configurations of ECUs are designed to change in various ways in accordance with differences in location where the ECUs are disposed, differences in specification between vehicles and the like.

On the other hand, it is desirable that the configurations of the ECUs be commonized as much as possible regardless of differences in type, grade and the like between vehicles. Such commonization of the circuit configurations contributes to reduction in ECU part numbers, reduction in manufacturing costs of ECUs, commonization of attachment work and the like.

When an ECU that can be commonly used in vehicles of various specifications is designed, however, a switch circuit that can cope with specifications of all types of loads is required. Accordingly, the number of components to be installed increases compared to a minimum number of components required in design.

For example, four switch elements are required to be installed for one load as in the output circuit 40 in JP2012-236472A. On the other hand, only one or two of the four switch elements may be used, depending on a type of a load actually connected to the output of an ECU. In this case, the remaining two or three switching elements of the four switching elements are uselessly attached components that are not used at all. Since such uselessly attached components are wasted, an increase in the number of components leads to an increase in the cost of the ECU.

The present disclosure is made in view of the above circumstance, and an object of the present disclosure is to provide a connector device that can reduce waste components that are uselessly attached when circuit configurations are commonized in electronic control units or the like in a vehicle.

SUMMARY OF INVENTION

A connector device has a constitution in a connector in which a plurality of terminals protrude into a connector opening. The plurality of terminals are respectively provided with a plurality of switches that have independent states of supplying power to the terminals and are switchable in between. A plurality of conductor plates are provided in the connector opening in an attachable and detachable state, and are each configured to electrically connect at least two of the plurality of terminals. The plurality of conductor plates are coupled by an insulating member.

The present disclosure is briefly described above. Details of the present disclosure can be further clarified by reading modes for carrying out the disclosure (hereinafter referred to as "embodiments") described below with reference to the accompanying drawings.

DESCRIPTION OF EMBODIMENTS

A specific embodiment of the present disclosure will be described below with reference to the drawings.

Figure 1:
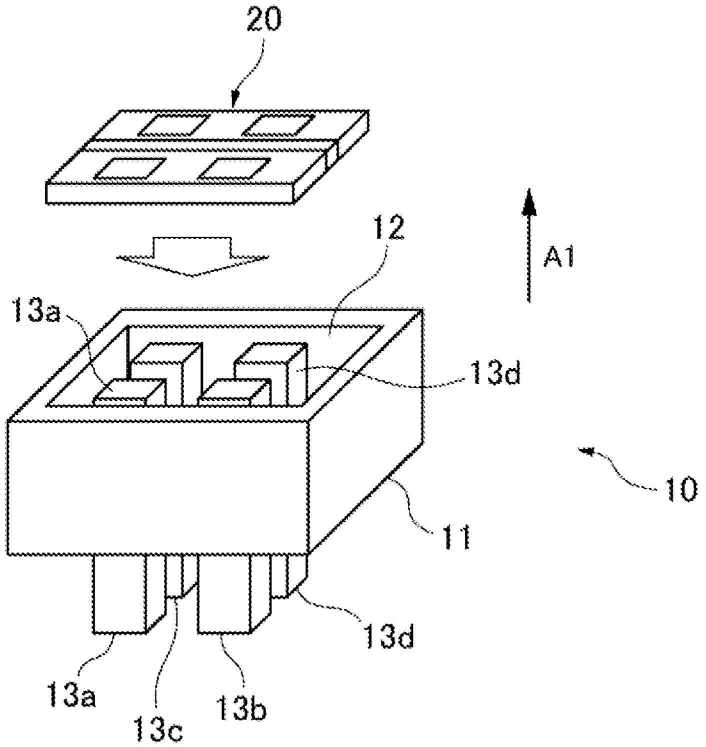
FIG. 1 is a perspective view showing an appearance of a main portion of a connector device according to an embodiment of the present disclosure.
Figure 2:
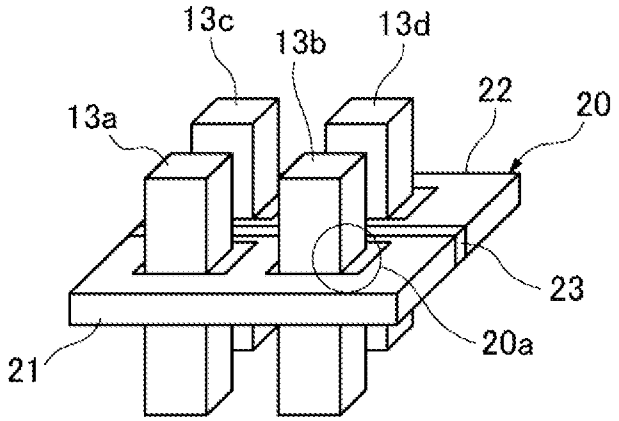
FIG. 2 is a perspective view showing inside of a connector to which a joint plate is installed.
Figure 3:
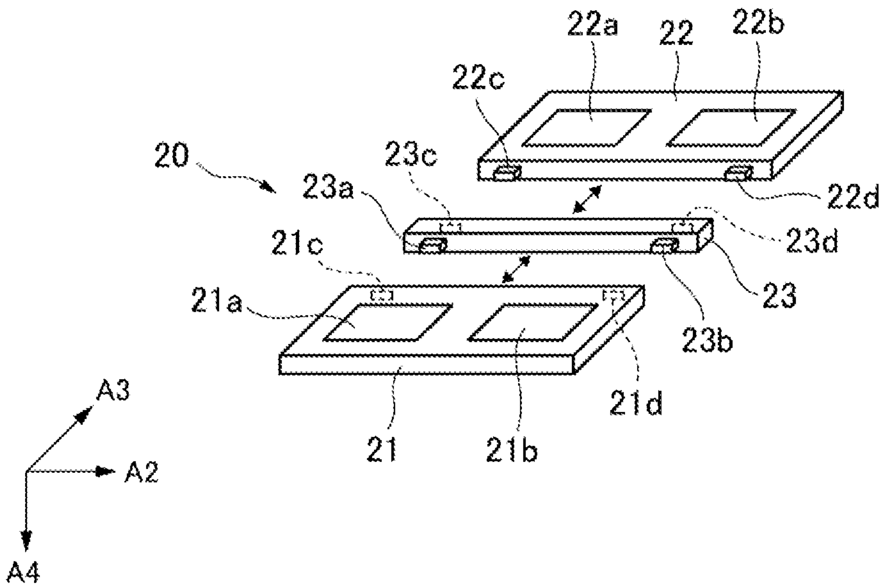
FIG. 3 is an exploded perspective view showing the joint plate.

FIG. 1 is a perspective view showing an appearance of a main portion of a connector device according to the embodiment of the present disclosure. FIG. 2 is a perspective view showing inside of a connector to which a joint plate 20 is installed. FIG. 3 is an exploded perspective view showing the joint plate 20.

As shown in FIG. 1, a connector 10 includes a connector housing 11 and a plurality of metal terminals 13*a*, 13*b*, 13*c*, and 13*d* accommodated in the connector housing 11. The connector 10 is male and has a rectangular connector opening 12.

The metal terminals 13*a* to 13*d* are arranged in parallel to each other, and protrude in an elongated pin shape into the connector opening 12 in a direction of an arrow A1 shown in FIG. 1. In the present embodiment, each of the metal terminals 13*a* to 13*d* has a rectangular cross-sectional shape.

Lower end sides of the metal terminals 13*a* to 13*d* are connected to a circuit such as a printed circuit board.

The connector 10 according to the present embodiment further includes the joint plate shown in FIG. 1. The joint plate 20 has a thin flat plate shape, and has an outer shape that is substantially the same as a cross-sectional shape of an inner peripheral wall of the connector opening 12. The joint plate 20 is attachable to and detachable from the connector opening 12 of the connector housing 11. Plural joint plates 20 of different types may be prepared to be selected appropriately according to the use of the connector 10.

As shown in FIG. 3, the joint plate 20 according to the present embodiment includes two copper plates 21, 22 and an insulating member 23. Each of the copper plates 21, 22 has a thin plate shape, and has a direction of an arrow A2 as a longitudinal direction.

The copper plate 21 has two through holes 21*a*, 21*b* through which the metal terminals 13*a*, 13*b* can be inserted, respectively. The through holes 21*a*, 21*b* have shapes and sizes that are the same as outer shapes of the metal terminals 13*a*, 13*b*. Similarly, the copper plate 22 has two through holes 22*a*, 22*b* through which the metal terminals 13*c*, 13*d* can be inserted, respectively. The through holes 22*a*, 22*b* have shapes and sizes that are the same as outer shapes of the metal terminals 13*c*, 13*d*.

As shown in FIG. 3, in a state in which the copper plate 21, the insulating member 23, and the copper plate 22 are arranged in a direction of an arrow A3, these components can be coupled laterally to be integrated. In the example shown in FIG. 3, the copper plate 21 is formed with concave portions 21*c*, 21*d* in a side surface thereof. The copper plate 22 is formed with a convex portion 22*c* and a convex portion 22*d* on a side surface thereof. The insulating member 23 is formed with convex portions 23*a*, 23*b* on a front side surface thereof, and is formed with concave portions 23*c*, 23*d* in a back side surface thereof.

The copper plate 21 and the insulating member 23 are coupled by aligning and fitting the concave portion 21*c* and the convex portion 23*a* as well as the concave portion 21*d* and the convex portion 23*b*, respectively. The copper plate 22 and the insulating member 23 are coupled by fitting the concave portion 23*c* and the convex portion 22*c* as well as the concave portion 23*d* and the convex portion 22*d*, respectively. The joint plate 20, in which the copper plates 21, 22 and the insulating member 23 are coupled and integrated, is inserted and installed into the connector opening 12 of the connector housing 11 as shown in FIG. 1. In the embodiment described in FIG. 3, the copper plate 21 has the concave portions 21*c*, 21*d*. The copper plate 21 may have convex portions that are fitted to concave portions of the insulating member 23. Similarly, the copper plate 22 may have concave portions that are fitted to convex portions of the insulating member 23.

When the joint plate 20 is installed to the connector housing 11, the metal terminals 13*a* to 13*d* and the joint plate 20 are coupled inside the connector housing 11 as shown in FIG. 2. That is, the metal terminals 13*a* to 13*d* penetrate the through holes 21*a*, 21*b*, 22*a*, and 22*b*, respectively.

The copper plates 21, 22 and the metal terminals 13*a* to 13*d* are formed of a conductor that has high conductivity, and thus the copper plate 21 and the metal terminal 13*a* are electrically connected, and the copper plate 21 and the metal terminal 13*b* are electrically connected. Further, the copper plate 22 and the metal terminal 13*c* are electrically connected, and the copper plate 22 and the metal terminal 13*d* are electrically connected.

Accordingly, electric circuits of the two metal terminals 13*a*, 13*b* are electrically connected (short-circuited) through the copper plate 21. Similarly, electric circuits of the two metal terminals 13*c*, 13*d* are electrically connected through the other copper plate 22. Since the insulating member 23 is interposed between the two copper plates 21, 22, the electric circuits of the metal terminals 13*a*, 13*b* are electrically insulated from the electric circuits of the metal terminals 13*c*, 13*d*.

The copper plates 21, 22 are provided with, at portions 20*a* in the vicinity of peripheral walls of the through holes 21*a*, 21*b*, 22*a*, and 22*b*, elastic members such as metal springs to maintain a good contact state of contact points with the metal terminals 13*a* to 13*d*. The contact state between the copper plates 21, 22 and the metal terminals 13*a* to 13*d* may also be maintained by a press-fitting structure or the like.

Even when the joint plate 20 is installed to the connector opening 12 of the connector housing 11, top ends of the metal terminals 13*a* to 13*d* protrude further upward of the joint plate 20. Accordingly, a counterpart female connector (not shown) can be fitted and coupled to the connector opening 12 of the connector 10 after the joint plate 20 is installed to the connector housing 11. Electronic components of various loads can be connected to the female connector through a wire harness.

<Configuration of Electronic Control Unit Using Connector Device>

Figure 4:
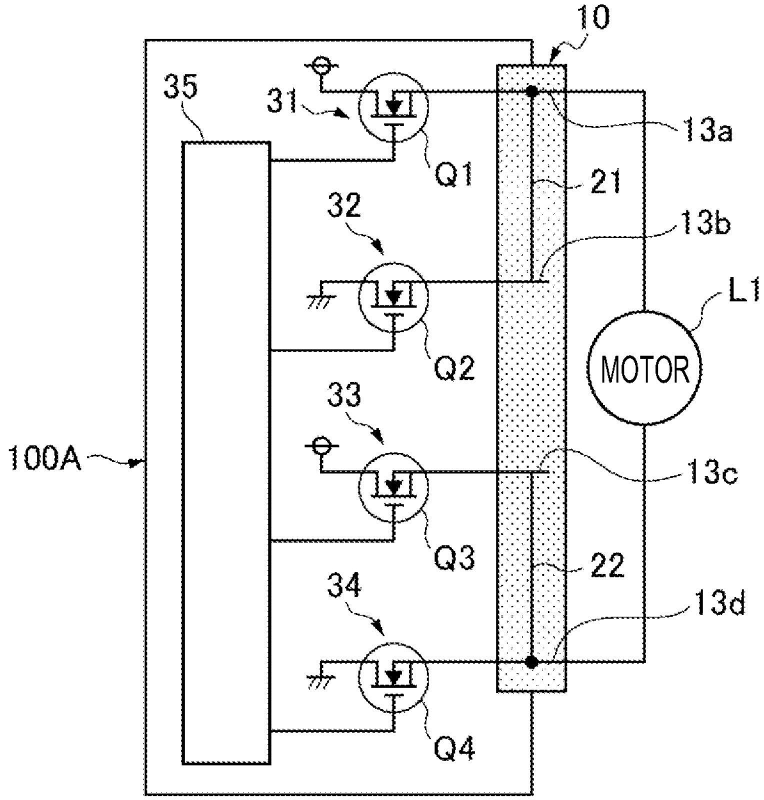
FIG. 4 is an electric circuit diagram showing a configuration example of an electronic control unit using the connector device of the present disclosure.
Figure 5:
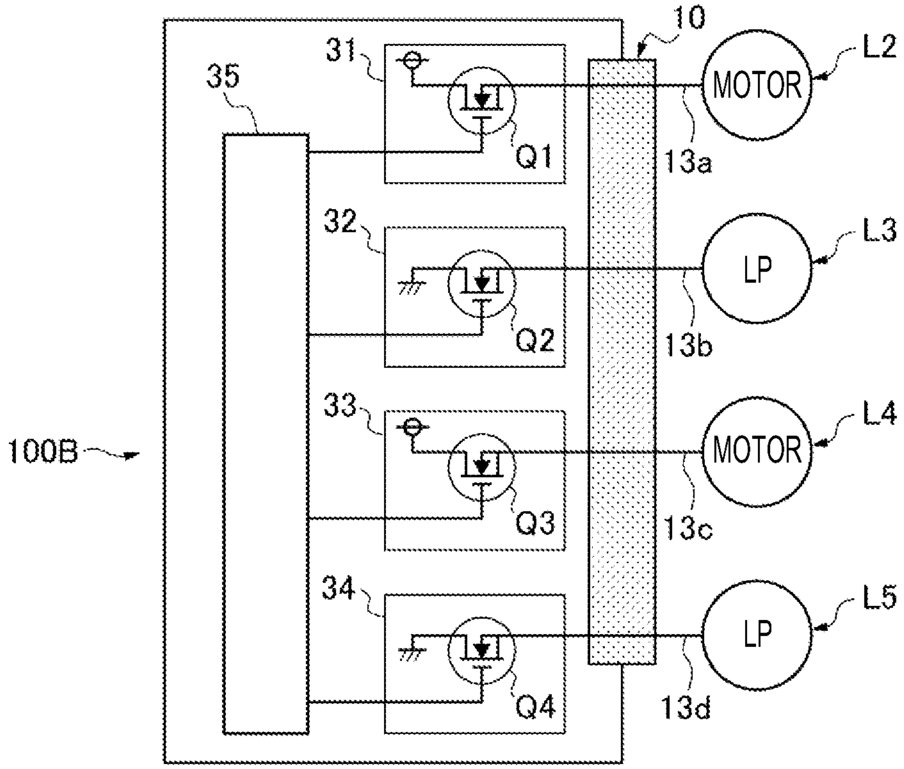
FIG. 5 is an electric circuit diagram showing a configuration example of an electronic control unit using the connector device of the present disclosure.

FIGS. 4 and 5 show electric circuit configurations of two types of electronic control units 100A, 100B using the connector 10 shown in FIGS. 1 to 3. The electronic control unit 100A shown in FIG. 4 is designed on an assumption of controlling energization of an electric motor that requires bidirectional drive control as a load L1.

The electronic control unit 100A includes four independent semiconductor switch elements Q1, Q2, Q3, and Q4, and a control unit 35. The two semiconductor switch elements Q1, Q3 constitute Hi side output circuits 31, 33, respectively, and the remaining two semiconductor switch elements Q2, Q4 constitute Lo side output circuits 32, 34, respectively.

The Hi side output circuit 31 can supply a high voltage to an output side when the semiconductor switch element Q1 is conducted. The Lo side output circuit 32 can supply a low voltage to an output side when the semiconductor switch element Q2 is conducted. The Hi side output circuit 33 can supply a high voltage to an output side when the semiconductor switch element Q3 is conducted. The Lo side output circuit 34 can supply a low voltage to an output side when the semiconductor switch element Q4 is conducted.

In the electronic control unit 100A, outputs of the Hi side output circuits 31, 33 and the Lo side output circuits 32, 34 are connected to the connector 10. The output of the Hi side output circuit 31 is connected to the metal terminal 13*a* of the connector 10, the output of the Lo side output circuit 32 is connected to the metal terminal 13*b* of the connector 10, the output of the Hi side output circuit 33 is connected to the metal terminal 13*c* of the connector 10, and the output of the Lo side output circuit 34 is connected to the metal terminal 13*d* of the connector 10.

The joint plate 20 is installed to the connector 10. Accordingly, the metal terminals 13*a*, 13*b* of the connector 10 are electrically connected by the copper plate 21, and the metal terminals 13*c*, 13*d* are electrically connected by the copper plate 22.

The load L1 is connected to the connector 10 through a predetermined wire harness. The load L1 has a positive terminal and a negative terminal connected to the metal terminals 13*a*, 13*d* of the connector 10, respectively. The positive terminal of the load L1 is also connected to the metal terminal 13*b* through the copper plate 21, and the negative terminal of the load L1 is also connected to the metal terminal 13*c* through the copper plate 22.

When the control unit 35 controls the semiconductor switch elements Q1, Q2, Q3, and Q4 to be in a conducted, non-conducted, non-conducted, and conducted state, respectively, a current flows through the load L1 in a forward direction. When the control unit 35 controls the semiconductor switch elements Q1, Q2, Q3, and Q4 to be in a non-conducted, conducted, conducted, and non-conducted state, a current flows through the load L1 in a reverse direction.

On the other hand, the electronic control unit 100B shown in FIG. 5 is designed on an assumption of separately controlling energization of four loads L2, L3, L4, and L5. In the example of FIG. 5, the two loads L2, L4 are electric motors that require application of a high voltage. The two loads L3, L5 are lamps (LP) that require application of a low voltage.

Similarly to the electronic control unit 100A of FIG. 4, an internal circuit of the electronic control unit 100B includes the Hi side output circuit 31, the Lo side output circuit 32, the Hi side output circuit 33, the Lo side output circuit 34, and the control unit 35. That is, the two types of electronic control units 100A, 100B use a circuit having a common configuration.

However, in the electronic control unit 100B of FIG. 5, the joint plate 20 is not installed to the connector 10. Accordingly, the electric circuits of the four metal terminals 13*a* to 13*d* of the connector 10 are each in an independent state.

In the electronic control unit 100B shown in FIG. 5, the control unit 35 can apply a high voltage to a terminal of the load L2 and drive the load L2 by controlling the semiconductor switch element Q1 to a conducted state. The control unit 35 can apply a low voltage to a terminal of the load L3 and drive the load L3 by controlling the semiconductor switch element Q2 to a conducted state.

The control unit 35 can apply a high voltage to a terminal of the load L4 and drive the load L4 by controlling the semiconductor switching element Q3 to a conducted state. The control unit 35 can apply a low voltage to a terminal of the load L5 and drive the load L5 by controlling the semiconductor switch element Q4 to a conducted state.

That is, by connecting the electric circuits as in the electronic control unit 100A of FIG. 4 and the electronic control unit 100B of FIG. 5 using the connector 10 as shown in FIGS. 1 to 3, the loads L1 to L5 having different specifications can be appropriately controlled even when electric circuits having the same configuration in the units are used. Since all of the four semiconductor switch elements Q1 to Q4 installed in the units can be effectively used, waste components that are uselessly attached can be reduced.

<Configuration of Electronic Control Unit Using General Connector>

Figure 6:
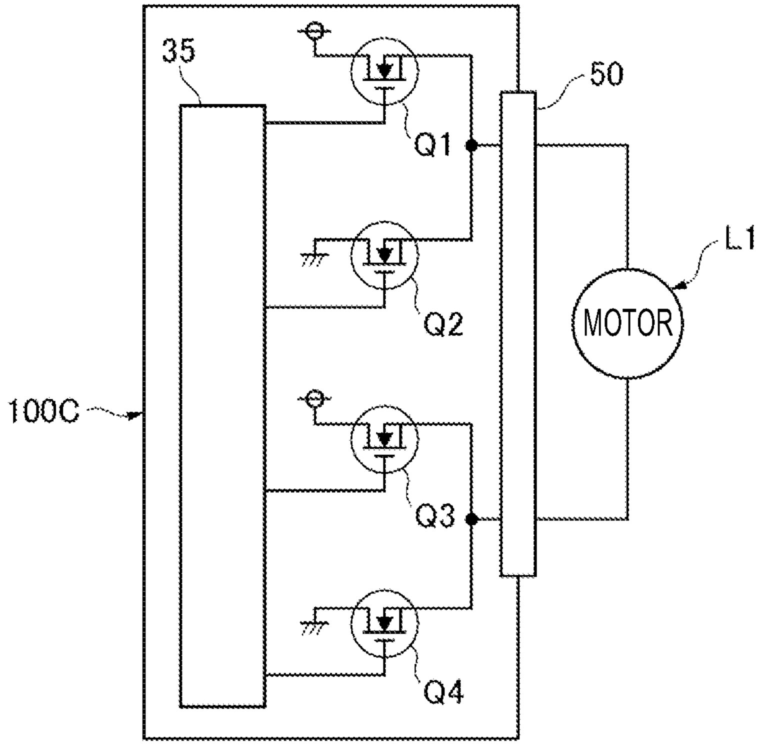
FIG. 6 is an electric circuit diagram showing a configuration example of an electronic control unit not using the connector device of the present disclosure.
Figure 7:
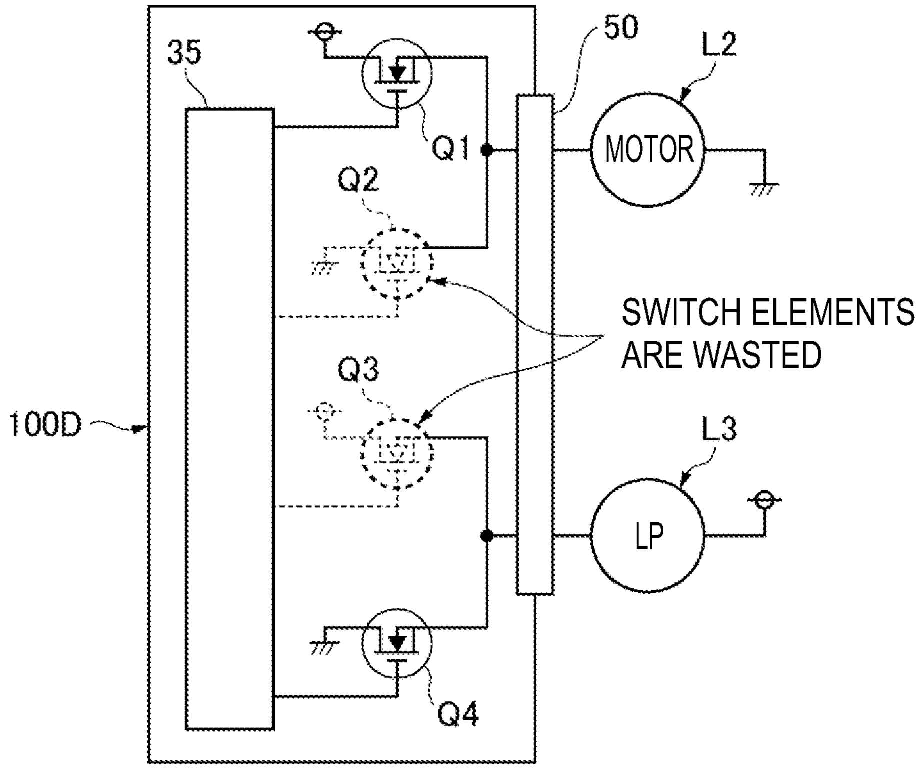
FIG. 7 is an electric circuit diagram showing a configuration example of an electronic control unit not using the connector device of the present disclosure.

FIGS. 6 and 7 show electric circuit configurations of two types of electronic control units 100C, 100D using a general connector 50.

In the electronic control unit 100C shown in FIG. 6, the load L1 is connected to an output side of the connector 50 having a general structure. Similarly, to the electronic control unit 100A of FIG. 4, a current is required to flow through the load L1 in two directions. For this reason, in an internal circuit of the electronic control unit 100C, outputs of the two semiconductor switch elements Q1, Q2 are electrically connected in common upstream of the connector 50. Outputs of the two semiconductor switch elements Q3, Q4 are electrically connected in common upstream of the connector 50.

On the other hand, the electronic control unit 100D shown in FIG. 7 is designed on a premise that an internal circuit having the same configuration as that of the electronic control unit 100C of FIG. 6 is used. In the electronic control unit 100D of FIG. 7, two types of loads L2, L3 are connected to the output side of the connector 50.

Here, the load L2 is required to be driven by application of a high voltage, and thus the electronic control unit 100D connects the load L2 to an output side of the semiconductor switch element Q1 through the connector 50. The load L3 is required to be driven by application of a low voltage, and thus the electronic control unit 100D connects the load L3 to an output side of the semiconductor switch element Q4 through the connector 50.

In the configurations of FIGS. 6 and 7, the electronic control units 100C, 100D can use a common internal circuit. However, outputs of the semiconductor switch elements Q1, Q2 are connected to the common circuit in advance and outputs of the semiconductor switch elements Q3 and Q4 are connected to the common circuit in advance, and thus this configuration cannot be changed. For this reason, although the electronic control unit 100D of FIG. 7 uses the semiconductor switch element Q1 for driving the load L2 and uses the semiconductor switch element Q4 for driving the load L3, the remaining two semiconductor switch elements Q2, Q3 are not effectively used. That is, the two semiconductor switch elements Q2, Q3 and components related thereto are uselessly attached, and the cost of the device is expected to increase by the amount of waste components installed in the electronic control unit 100D.

As described above, the connector 10 according to the present embodiment can use a circuit unit having a common internal circuit configuration when connecting loads of different types and specifications to an output side as in the electronic control units 100A, 100B of FIGS. 4 and 5. In addition, the circuit configuration can be changed as necessary at the connector by attaching, detaching or replacing the joint plate 20 installed to the connector 10. For this reason, all of the plural semiconductor switch elements Q1 to Q4 installed in the internal circuit as in the electronic control units 100A, 100B can be effectively used. That is, the number of components that are uselessly attached such as the semiconductor switching elements Q2, Q3 in FIG. 7 can be reduced. Accordingly, even when specifications of a vehicle or specifications of equipment to be mounted are frequently changed as in a case of an in-vehicle device, an ECU having a common configuration can be used without design changes, and the number of components that are uselessly attached can be reduced.

The present disclosure is not limited to the above-described embodiment, and can be appropriately modified, improved and the like. In addition, materials, shapes, sizes, numbers, arrangement positions and the like of components in the above-described embodiment are freely selected and are not limited as long as the present disclosure can be implemented.

For example, in the joint plate 20 installed to the connector 10 shown in FIGS. 1 to 3, the two metal terminals 13*a*, 13*b* are commonly connected by the copper plate 21, and the two metal terminals 13*c*, 13*d* are commonly connected by the copper plate 22 at the same time. Alternatively, for example, the copper plate 22 may be replaced with an insulating member, the two metal terminals 13a, 13b may be connected by the copper plate 21, and the circuits of the two metal terminals 13c, 13d may be used independently. Alternatively, three metal terminals may be commonly connected by the L-shaped copper plate 21, and the remaining one metal terminal alone may penetrate the insulating member. Plural types of joint plates 20 having different configurations may be prepared in advance and be switched between the types and used as necessary.

Here, features of the connector device according to the embodiment of the present disclosure described above are briefly summarized and listed below.

According to an aspect of the present disclosure, a connector device has a constitution (joint plate 20) in a connector (10) in which a plurality of terminals (metal terminals 13a to 13d) protrude into a connector opening (12). The plurality of terminals are respectively provided with a plurality of switches (semiconductor switch elements Q1 to Q4) that have independent states of supplying power to the terminals and are switchable in between. A plurality of conductor plates (copper plates 21, 22) are provided in the connector opening in an attachable and detachable state, and are each configured to electrically connect at least two of the plurality of terminals. The plurality of conductor plates (copper plates 21, 22) are coupled by an insulating member (23).

According to the connector device having the above configuration, presence and absence of the electrical connection between the plurality of terminals can be switched by attaching and detaching the conductor plates to and from the connector opening. Accordingly, it is possible to perform control corresponding to differences in specification between loads connected downstream of the connector while maintaining a common configuration of an upstream electric circuit (ECU or the like) including the plurality of switches. For this reason, components (switches or the like) installed in the ECU having a common configuration can be easily prevented from being uselessly attached.

According to an aspect of the present aspect, an area of the plurality of conductor plates and the insulating member is substantially the same size as an area of the connector opening (12) (see FIG. 1), when viewed in an extending direction (direction A1) of the terminals in a state in which the plurality of conductor plates are coupled by the insulating member.

According to the connector device having the above configuration, the plurality of conductor plates and the insulating member coupled to each other can be easily and firmly fixed to the connector opening by commonizing the areas.

According to an aspect of the present disclosure, the plurality of switches include a first switch (semiconductor switch element Q1) to output a high-level voltage to a first terminal (metal terminal 13a), and a second switch (semiconductor switch element Q2) to output a low-level voltage to a second terminal (metal terminal 13b). The conductor plates constitute a joint member (joint plate 20) that electrically connects the first terminal and the second terminal in a state of being installed in the connector opening.

According to the connector device having the above configuration, a load requiring the high-level voltage can be driven using the output of the first switch, and a load requiring the low-level voltage can be driven using the output of the second switch. Further, by installing the joint member to the connector opening, the first switch and the second switch can be combined, and a current can flow bidirectionally through a load requiring switching of a driving direction.

According to an aspect of the present disclosure, the plurality of switches include a first switch (semiconductor switch element Q1) to output a high-level voltage to a first terminal (metal terminal 13a), a second switch (semiconductor switch element Q2) to output a low-level voltage to a second terminal (metal terminal 13b), a third switch (semiconductor switch element Q3) to output a high-level voltage to a third terminal (metal terminal 13c), and a fourth switch (semiconductor switch element Q4) to output a low-level voltage to a fourth terminal (metal terminal 13d). The conductor plates include, in a state of being installed to the connector opening, a first joint member (copper plate 21) that electrically connects the first terminal and the second terminal, a second joint member (copper plate 22) that electrically connects the third terminal and the fourth terminal, and the insulating member (23) that physically couples the first joint member and the second joint member in a state in which the first joint member and the second joint member are electrically insulated.

According to the connector device having the above configuration, an H-bridge circuit as shown in FIG. 4 can be implemented by a combination of the first switch, the second switch, the third switch, and the fourth switch. This facilitates control of a load such as an electric motor that requires switching of a driving direction.

According to an aspect of the present disclosure, the plurality of switches include a first switch to output a high-level voltage to a first terminal, a second switch to output a low-level voltage to a second terminal, a third switch to output a high-level voltage to a third terminal, and a fourth switch to output a low-level voltage to a fourth terminal. The conductor plates include, in a state of being installed to the connector opening, a first joint member that electrically connects the first terminal and the second terminal, a second joint member that electrically connects the third terminal and the fourth terminal, and the insulating member that physically couples the first joint member and the second joint member in a state in which the first joint member and the second joint member are electrically insulated. The first joint member (copper plate 21) has a first through hole (through hole 21a) and a second through hole (through hole 21b) through which the first terminal and the second terminal are inserted, respectively. The second joint member (copper plate 22) has a third through hole (through hole 22a) and a fourth through hole (through hole 22b) through which the third terminal and the fourth terminal are inserted, respectively. The first joint member has a first concave portion or a first convex portion (concave portion 21c, concave portion 21d) that are fitted to the insulating member in a direction intersecting an insertion direction of the terminals. The second joint member has a second concave portion or a second convex portion (convex portion 22c, convex portion 22d) that are fitted to the insulating member in the direction intersecting with the insertion direction of the terminals.

According to the connector device having the above configuration, it is possible to implement a conductor plate having an appropriate configuration necessary for constituting an H-bridge circuit with a combination of the first switch, the second switch, the third switch, and the fourth switch. The first joint member and the insulating member can be coupled, and the second joint member and the insulating member can be coupled.

What is claimed is:

1. A connector device having a constitution in a connector in which a plurality of terminals protrude into a connector opening, wherein the plurality of terminals are respectively provided with a plurality of switches for independently switching states of power supply to the terminals, a plurality of conductor plates are provided in the connector opening in an attachable and detachable state, and are each configured to electrically connect at least two of the plurality of terminals together the plurality of conductor plates are coupled with each other by an insulating member, and an area of the plurality of conductor plates and the insulating member is substantially the same size as an area of the connector opening, when viewed in an extending direction of the terminals in a state in which the plurality of conductor plates are coupled by the insulating member.

2. The connector device according to claim 1, wherein the plurality of switches include a first switch to output a high-level voltage to a first terminal, and a second switch to output a low-level voltage to a second terminal, and one of the conductor plates constitutes a joint member that electrically connects the first terminal and the second terminal in a state of being installed in the connector opening.

3. The connector device according to claim 1, wherein the plurality of switches include a first switch to output a high-level voltage to a first terminal, a second switch to output a low-level voltage to a second terminal, a third switch to output a high-level voltage to a third terminal, and a fourth switch to output a low-level voltage to a fourth terminal, and the conductor plates include, in a state of being installed in the connector opening, a first joint member that electrically connects the first terminal and the second terminal, a second joint member that electrically connects the third terminal and the fourth terminal, and the insulating member that physically couples the first joint member and the second joint member in a state in which the first joint member and the second joint member are electrically insulated.

4. The connector device according to claim 1, wherein the plurality of switches include a first switch to output a high-level voltage to a first terminal, a second switch to output a low-level voltage to a second terminal, a third switch to output a high-level voltage to a third terminal, and a fourth switch to output a low-level voltage to a fourth terminal, the conductor plates include, in a state of being installed in the connector opening, a first joint member that electrically connects the first terminal and the second terminal, a second joint member that electrically connects the third terminal and the fourth terminal, and the insulating member that physically couples the first joint member and the second joint member in a state in which the first joint member and the second joint member are electrically insulated, the first joint member has a first through hole and a second through hole through which the first terminal and the second terminal are inserted, respectively, the second joint member has a third through hole and a fourth through hole through which the third terminal and the fourth terminal are inserted, respectively, the first joint member has a first concave portion or a first convex portion that are fitted to the insulating member in a direction intersecting an insertion direction of the terminals, and the second joint member has a second concave portion or a second convex portion that are fitted to the insulating member in the direction intersecting with the insertion direction of the terminals.

* * * * *